(12) United States Patent
Massone

(10) Patent No.: US 10,449,580 B2
(45) Date of Patent: Oct. 22, 2019

(54) DEVICE AND METHOD FOR THE TREATMENT OF FORSU

(71) Applicant: AUSTEP S.P.A., Milan (MI) (IT)

(72) Inventor: Alessandro Giuseppe Massone, Milan (IT)

(73) Assignee: AUSTEP S.P.A., Milan (IT)

( * ) Notice: Subject to any disclaimer, the term of this patent is extended or adjusted under 35 U.S.C. 154(b) by 534 days.

(21) Appl. No.: 15/031,402

(22) PCT Filed: Oct. 14, 2014

(86) PCT No.: PCT/IB2014/002088
§ 371 (c)(1),
(2) Date: Apr. 22, 2016

(87) PCT Pub. No.: WO2015/056073
PCT Pub. Date: Apr. 23, 2015

(65) Prior Publication Data
US 2016/0296986 A1 Oct. 13, 2016

(30) Foreign Application Priority Data
Oct. 16, 2013 (IT) .............................. CO2013A0050

(51) Int. Cl.
*B09B 3/00* (2006.01)
*B01F 7/24* (2006.01)
(Continued)

(52) U.S. Cl.
CPC ................ *B09B 3/00* (2013.01); *B01F 7/082* (2013.01); *B01F 7/243* (2013.01);
(Continued)

(58) Field of Classification Search
CPC .... B09B 3/00; Y02W 30/625; B29B 17/0408; B29B 2017/0094; B29C 48/277
See application file for complete search history.

(56) References Cited

U.S. PATENT DOCUMENTS 5,028,010 A * 7/1991 Sansing .................. B01F 13/10
241/101.6
2013/0108506 A1* 5/2013 De La Fuente Munoz ..................
A61L 11/00
422/26

FOREIGN PATENT DOCUMENTS

DE 10 2005 002 997 7/2006
EP 2 006 034 12/2008
WO 93/04754 3/1993

OTHER PUBLICATIONS

International Preliminary Report on Patentability dated Apr. 19, 2016 in International (PCT) Application No. PCT/IB2014/002088.
(Continued)

*Primary Examiner* — Tony G Soohoo
*Assistant Examiner* — Elizabeth Insler
(74) *Attorney, Agent, or Firm* — Troutman Sanders LLP

(57) ABSTRACT

Herein proposed is a device (45) with a first module (10) for the production of a heterogeneous mixture of FORSU which, after the removal of the most coarse inerts, is dropped—by gravity—in an underlying second module (46), in which along the three chambers (47, 52, 54) in succession to the heterogeneous mixture of FORSU there are collected the further residue coarse inerts as well as the finest and heaviest inerts and there is obtained a mixture with matrix homogenised substantially in the liquid state and thus dischargeable by pumping reliably. In the device (45) the first module (10) is mounted on the underlying second module (46) through the interposition of load cells (59). With the proposed device the FORSU in the liquid state may be pumped directly in an anaerobic digestor thus avoiding an intermediate transport thereof.

10 Claims, 13 Drawing Sheets

(51) Int. Cl.
*B01F 7/08* (2006.01)
*B01F 15/02* (2006.01)
*B01F 13/10* (2006.01)

(52) U.S. Cl.
CPC ...... *B01F 13/1027* (2013.01); *B01F 15/0203* (2013.01); *B01F 15/027* (2013.01); *B01F 15/0289* (2013.01); *B09B 2220/00* (2013.01)

(56) References Cited

OTHER PUBLICATIONS

International Search Report dated Feb. 3, 2015 in International Application No. PCT/EB2014/002088.

* cited by examiner

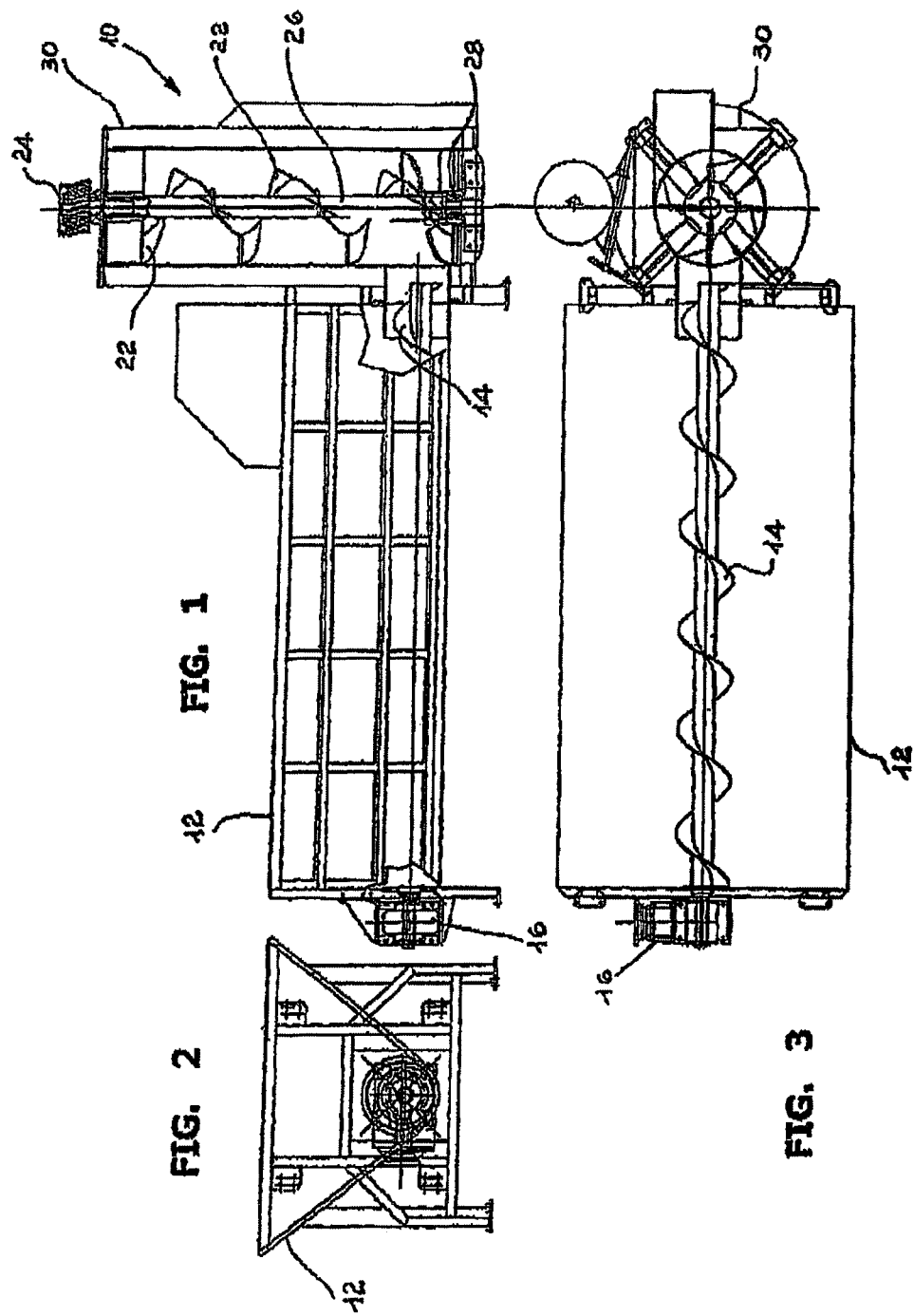

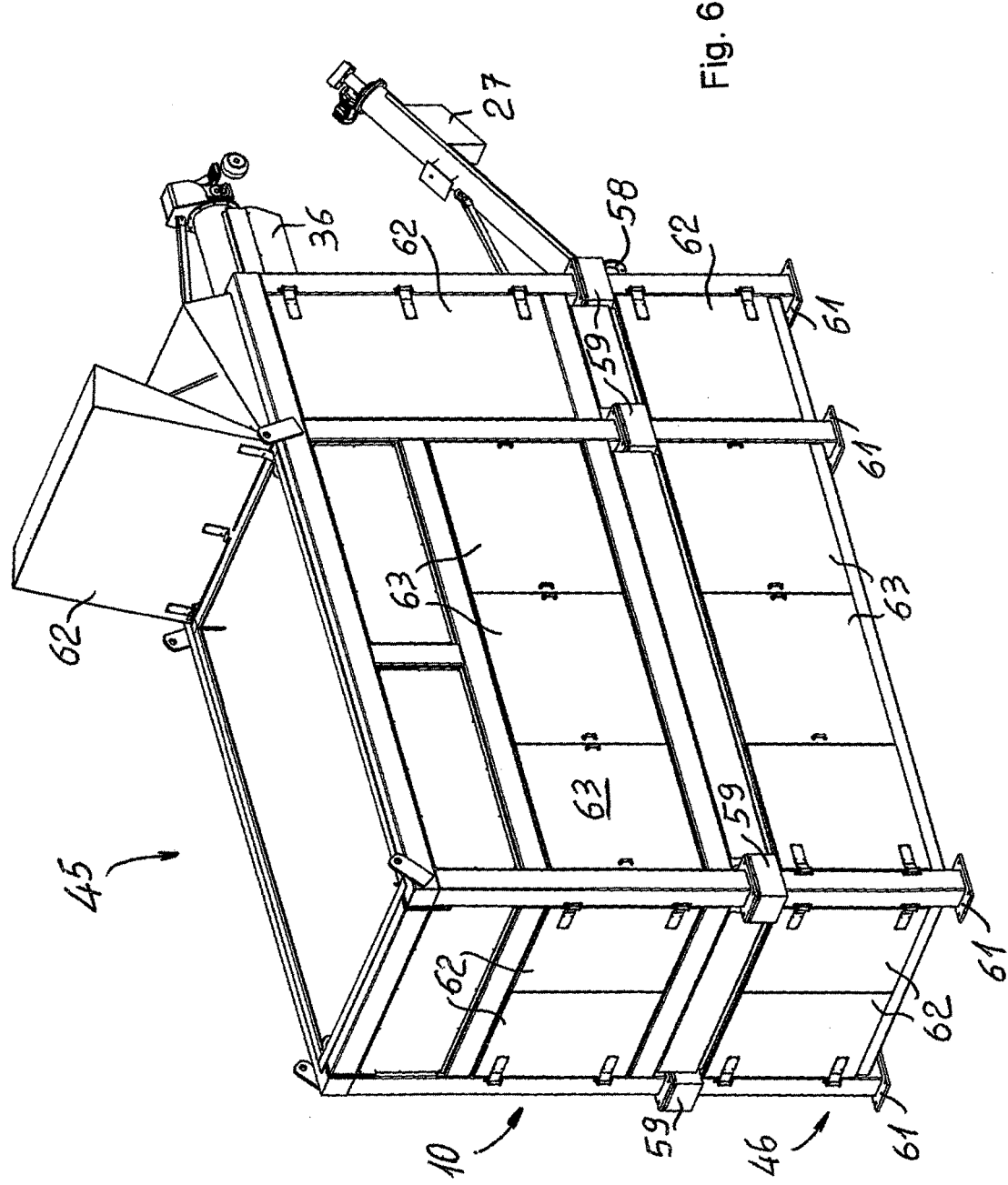

DEVICE AND METHOD FOR THE TREATMENT OF FORSU

DESCRIPTION OF THE INVENTION

Field of the Application

The present invention refers to a device and method for the treatment of FORSU (Frazione Organica of Rifiuti Solidi Urbani, i.e. Organic Fraction of Municipal Solid Waste) according to the preambles of claims 1 and 5.

Technological Background and State of the Art

As known FORSU, also commonly referred to as "moist" waste, is collected in various municipalities through separate collection or through door to door collection (in small biodegradable bags), or by collection through waste containers.

While the domestic FORSU as urban solid waste mainly contains food remnants such as meat remnants, fish remnants, pasta remnants, bread remnants and remnants of food products used for the preparation of meals, as well as fruit and vegetable remnants and they are collected in small biodegradable plastic bags, the FORSU coming from the collection through waste collection containers may also contain various materials, referred to as "inerts", such as for example diapers, sand for beddings for cats, pebbles, stones, metal parts, glass, same case applying to heavy organic material not useful for anaerobic digestion for producing biogas, such as for example bones, fruit seeds, dry fruit shells, shells of crustaceans and shells of molluscs, mussels, clams and the like.

Given that the FORSU mainly contains organic wastes, the same, such as biomass, after an anaerobic treatment in digesters may provide biogas, which can also be used as a source of alternative energy for the production of heat and/or electricity in known co-generators.

For the supply of the FORSU in the known anaerobic digesters, the FORSU must be previously taken in a mixed form with a mixing liquid, for example water, recirculated water or the like.

Document EP 2 006 034 A1 discloses a device for separating the most coarse inerts, such as the aforementioned plastic bags, Tetrapak-like containers, various types of carton containers and the like from organic waste materials, adapted to be recycled. The disclosed device has a first vat for the reception of FORSU with a longitudinal auger for the advancement of the same and for the introduction of FORSU into an adjacent cylindrical filter arranged vertical and with open ends, in which there is housed a structure similar to a vertical auger for lifting and lacerating the bags and the like, which can be actuated through a motor, wherein said group formed by the cylinder filter and the auger structure is housed with clearance in a vertical column casing having, distributed on the external surface, a plurality of fittings with nozzles for the introduction—in said casing—of a plurality of water jets which, entering into the perforated cylindrical filter carries the FORSU in forma of a heterogeneous mixture which falls downwards—by gravity—into an underlying collection container while the most coarse and lacerated inerts are transported upwards by the auger structure and discharged outside the device, wherein the illustrated auger has an interrupted unwinding with interposed laceration blades.

The illustrated device reveals various drawbacks. In the first place the supplied mixture of FORSU constitutes a quite heterogeneous and scarcely pumpable product, in which there are still at least contained for the heaviest and finest inerts, which easily fall together with the mixture being formed through the lower open end of the cylindrical filter in an underlying collection container. Given that the supplied mixture of FORSU is heterogeneous, and thus it does not allow a reliable discharge pumping, the problem of the transfer of the supplied mixture of FORSU shall be addressed by other solutions to be established from time to time with the purchaser or user of the device.

Document GB 2 354 720 A discloses a vertical auger press with auger housed in a cylindrical filter in turn housed with an interspace in a vertical casing, in the interspace there being water jet nozzles guiding against the cylindrical filter to keep the perforations of the filter clean. The filter has—at the lower part—an opening for the introduction of a mixture with organic material to be treated and a discharge at the upper end of the auger.

An arrangement of the auger housed in a cylindrical filter in vertical casing for the separation of a suspension with solid material, with discharge of the solid fraction from the tarp part of the auger and discharge of the filtrate—by gravity—is also known in a filter-press disclosed by document DE 102005002997 A1.

SUMMARY OF THE INVENTION

The present invention has the task of proposing a device and a method for the treatment of FORSU capable of overcoming the drawbacks of the prior art.

The indicated task is overcome, according to the invention, with a device and a method for the treatment of FORSU, and analogous products, which have the characteristics indicated in claims 1 and 5.

Further advantageous developments are observable from the dependent claims.

With the device and the method according to the invention there are obtained various important advantages.

In the first place there is provided a FORSU mixture practically homogenised in the liquid state and substantially without all the inerts, also including the smaller and heavier inerts, hence the supplied FORSU mixture may be discharged by pumping, for example for the direct supply in anaerobic digesters or intermediate storage containers.

In the device according to the invention the transfer of the quite heterogeneous FORSU mixture coming from a device of the filter and vertical auger type of the prior art, for example as illustrated in document EP 2 006 034 A1, forming, according to the invention, the first module of two operating modules of the device according to the invention, occurs directly, i.e. without any intermediate transfer, from the first to the second module, in the latter there occurring the removal of the remaining inerts, with the ensuing formation of a FORSU mixture practically homogenised in the liquid state and reliably dischargeable by pumping.

A further advantage lies in the fact that the mixing and advancing of the FORSU mixture in the second module occurs by using a single auger.

An even more important advantage of the device according to the invention lies in the superimposed arrangement of the first module on the second module of the device by interposing load cells, thus the weight of the loaded FORSU can be detected and thus regulate the amount of water to be supply, same case applying, through a control logic easy to execute, perform measurements on how much FORSU is treated by the device.

The arrangement and dimensioning of the three chambers provided for in the second module, or lower or homogenisation modules, allow obtaining a compact device.

Another important advantage of the device lies in attaining the two modules with panelled casings, or having fixed panels and panels that can be opened in a door-like manner for an easy and quick access to the parts of the device requiring maintenance.

Another advantage lies in the simplified execution of the hoisting and laceration auger structure, given that the same is meant to be executed as a succession of axially spaced auger segments, which simultaneously supply the front laceration sides shaped as laceration corners.

With the method according to the invention there is provided a plurality of treatment steps in a continuous sequence allowing obtaining a practically homogenised FORSU mixture in the liquid state and reliably pumpable independently from the composition of the FORSU, or similar organic mixture, supplied from time to time.

Another advantage of the proposed device and method lies in the fact that the same allow treating waste materials with organic matrices coming from the food products transformation industry, same case applying to large distribution or catering waste products which treat and transform biodegradable products such as fruits, vegetables, meat, fish, cheese and food products in general.

BRIEF DESCRIPTION OF THE DRAWINGS

Further characteristics, advantages and details of the device and the method according to the present invention shall be more apparent from the following description of an embodiment illustrated schematically by way of example in the attached drawings, which show, for the sake of greater clarity, in two different scales:

FIGS. 1 to 5 illustrations of the first module or mixing module for the formation of a heterogeneous FORSU mixture of the known type, as disclosed for example in document EP 2 006 034 A1, whose reference numbers are maintained, and more precisely:

FIG. 1 shows a lateral view of a vat for the collection of materials to be treated associated to a vertical selection device, i.e. elimination of the plastic inerts, carton inerts and similar coarser inerts, FIG. 2 shows a front view of the vat for collecting or loading the material, FIG. 3 is a top view of the collection vat and vertical selection device, FIG. 4 is a perspective view of the selection part without a front panel for illustrating the internal components of the device, and FIG. 5 shows a lateral perspective view of the separation device; while FIG. 6 shows a top perspective view of the device according to the invention complete, or comprising a first upper mixing module and a second lower homogenisation module, arranged on top of each other.

DESCRIPTION OF THE PREFERRED EMBODIMENT

Figure 4:
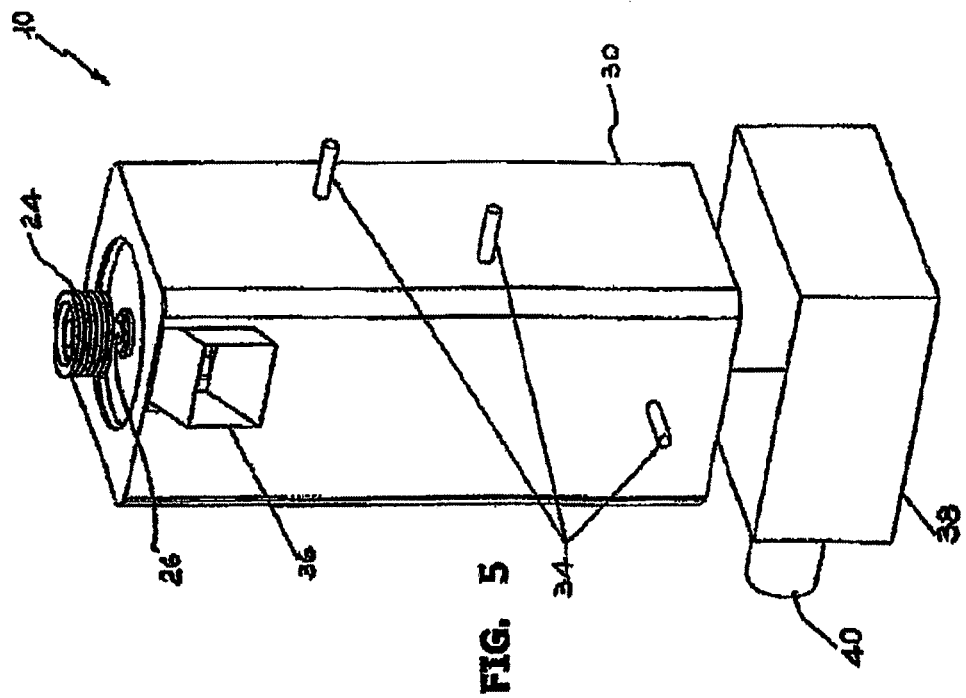
Figure 5:
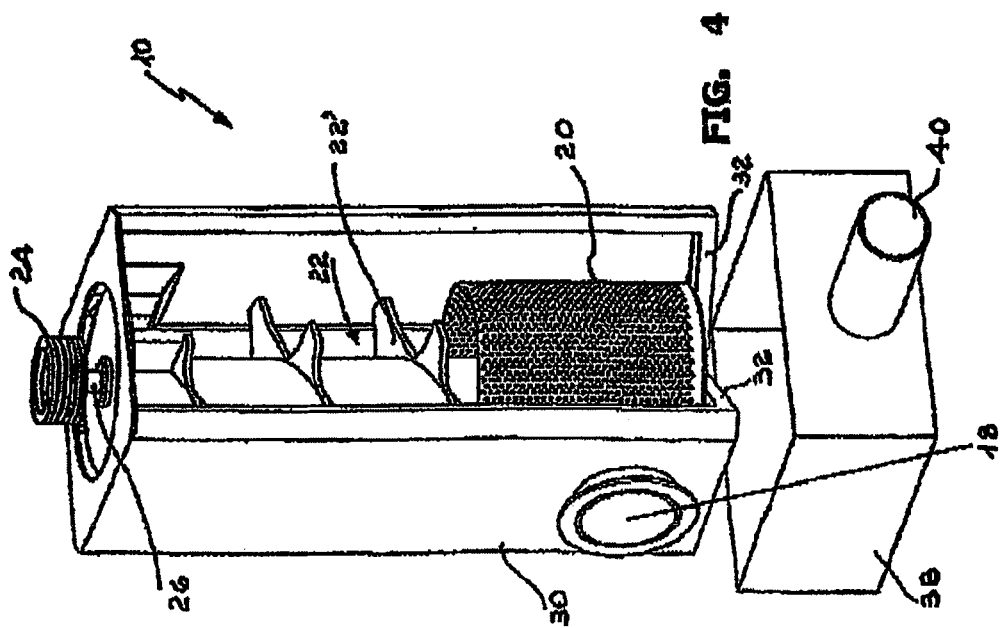
Figure 14:
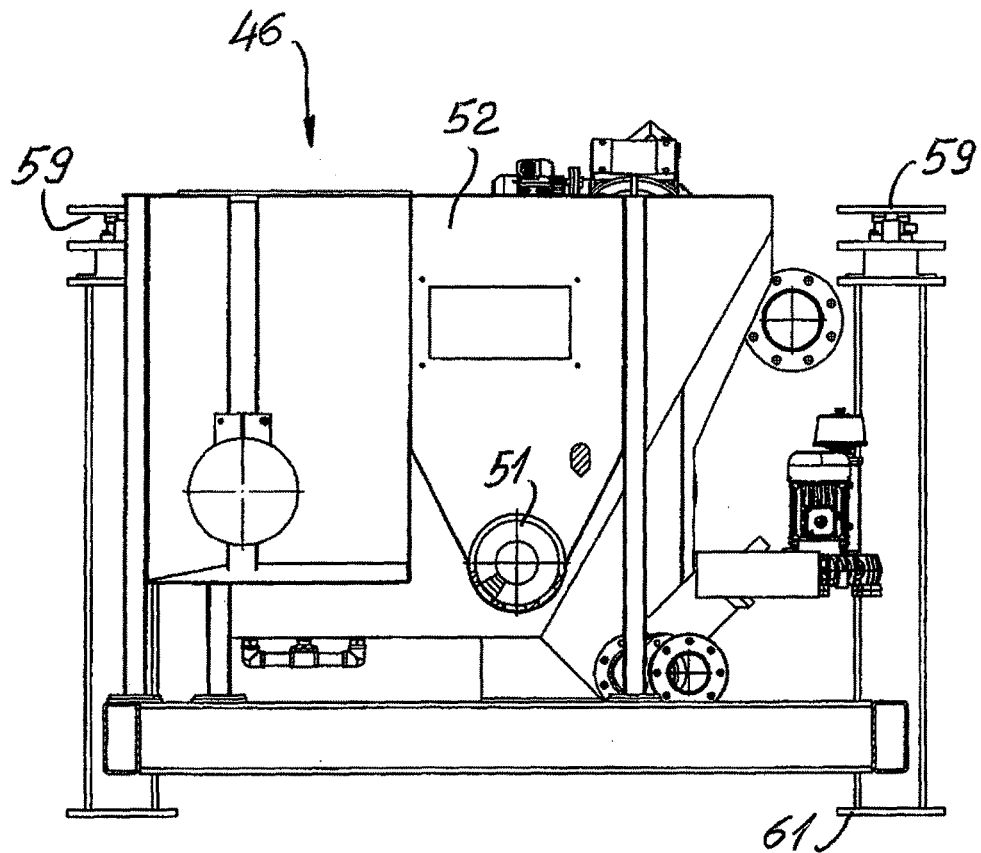
FIG. 14 shows a cross-sectional view according to line D-D in FIG. 13.
Figure 4A:
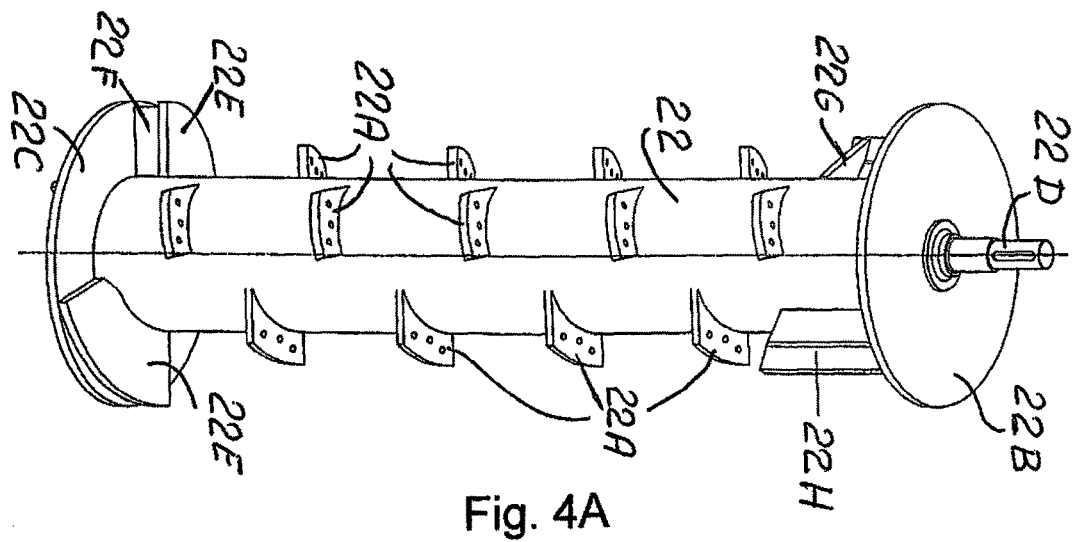
FIG. 4A shows a perspective view of a preferred execution according to the invention of a conformation of a lifting and laceration auger housed in the vertical cylinder perforated like a filter.

For the description of the first module, upper module or mixing module the known heterogeneous FORSU mixture refers—for the sake of comfort—to FIGS. 1 to 5 of document EP 2 006 034 A2 with relative numbering, in which the illustrated device is indicated in its entirety with 10 and comprises a vat 12 for receiving the material to be treated or FORSU with an auger 14 for the transfer/advancement actuatable by a motor 16 and conveying the FORSU to a fixed vertical cylindrical element perforated like a filter, with open ends through the loading fitting 18 which terminates in said perforated cylinder 7 which extends substantially for the height of the column casing 30 with a clearance or interspace and it houses an auger 22 therein with a shank 26 associated to an actuation motor 24. The spiral of the auger 22 has a conformation interrupted with blades 22', hence the besides lifting the FORSU the auger is adapted to lacerate and break the plastic bags and carton containers of the Tetrapak type and the like, which are then discharged with the other coarse inerts through the upper openings 36. 34 is used to indicate tubular fittings for introducing the mixing liquid, for example water, recycled water or the like, whose jets traverse the clearance or interspace and penetrate into the cylindrical filter 20 in which the water is mixed with the FORSU and forms a mixture therewith, the mixture dropping—by gravity—, according to the prior art, into an underlying collection container 38 with a discharge opening 40, wherein said heterogeneous mixture drives all the intermediate inert elements as well as the finest and heaviest inerts therewith, as refereed to hereinafter.

Here is where intervenes the invention, which allows avoiding the use of the known collection containers 38 and, according to a first teaching, the heterogeneous FORSU mixture falling—by gravity—from the filter element 20 of the first module or mixing module 10 is made to directly drop from the first module or upper module 10 into the underlying second module or homogenisation module 45, as explained more in detail hereinafter.

Firstly, it is observed that, according to the invention, the conformation of the lifting and laceration auger is provided as an arrangement of helical sectors 22A distributed spaced axially and circumferentially on the shaft 22 whose terminal discs of the upper and lower end are indicated with 22B and 22C and whose upper end can be connected with the actuation motors indicated with 22D. The reference number 22E is used to indicate helical sectors for starting lifting and 22F is used to indicate thickness inserts, while 22G and 22H indicate upper segments for discharging the most coarse inerts.

Figure 6A:
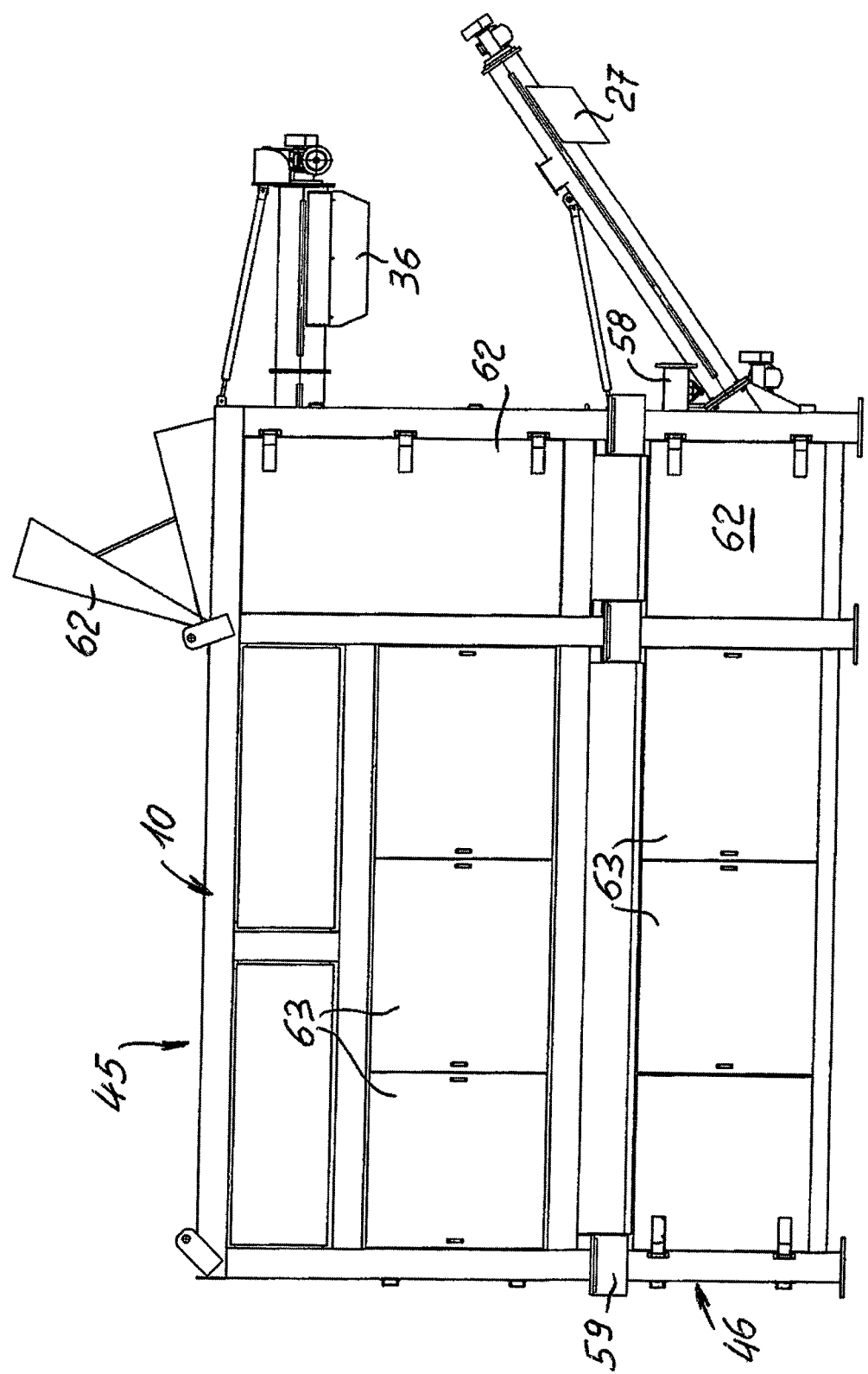
FIG. 6A shows a side elevational view of the device of FIG. 1.
Figure 7:
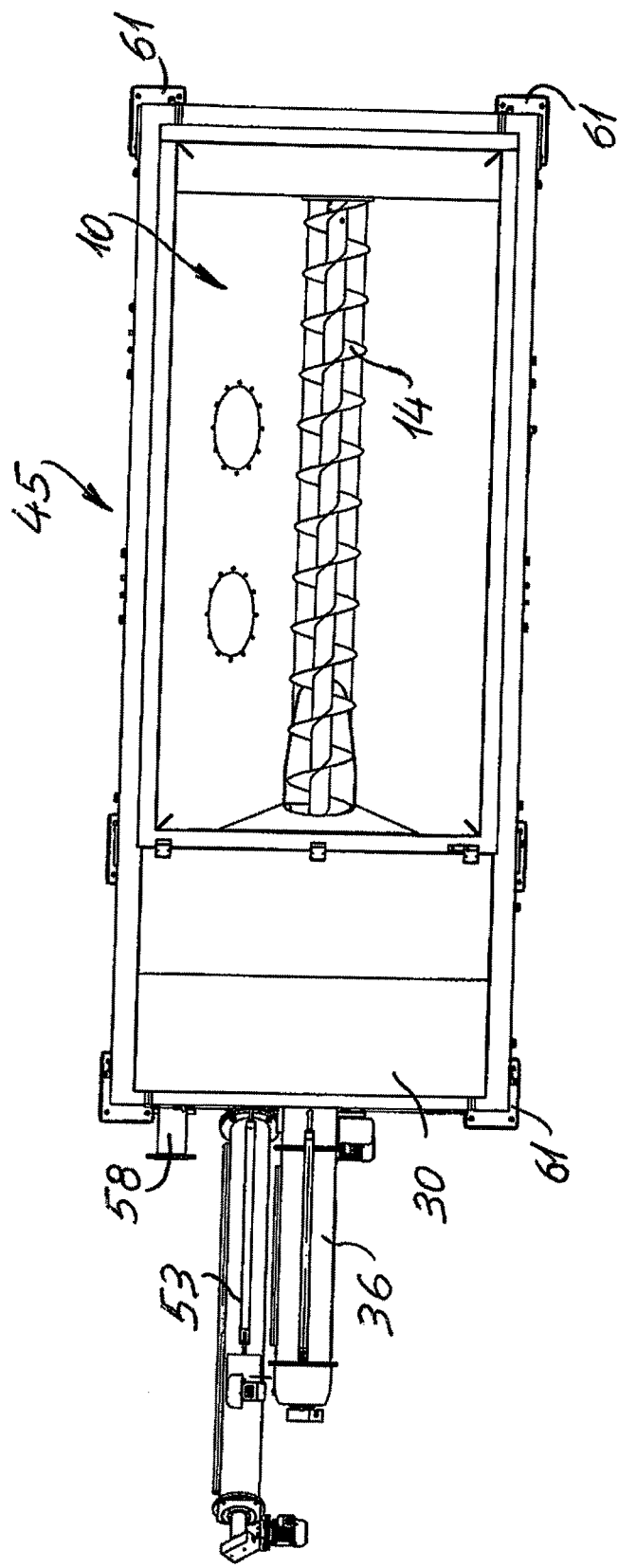
FIG. 7 shows a top view on the upper module of the device according to the invention illustrated in FIG. 6.

Now, with reference to FIG. 6 the device according to the invention is indicated in its entirety with 45 and it comprises the first module or upper module 10, performed according to the prior art, for example similar to the one illustrated in document EP 2 006 034 A1 without the colection container 38, and a second module or lower module or homogenisation module 46, wherein in FIG. 7 there can be observed the auger 14 for transferring the FORSU, as well as the position of the vertical column 30 housing the filter with auger 20, which is advantageously executed in a simplified manner as a sequence of auger segments spatially axially so as to form front sides like sharp corners for the laceration of the plastic bags, Tetrapak-like containers, carton containers and the like.

According to the invention the heterogeneous mixed FORSU mixture, discharged—by gravity—from said filter-auger vertical group 20, 22 is thus no longer collected in a collection container but directly discharged (arrow F, FIG. 8) in a first vat or chamber 47 of the second module or lower homogenisation module 46.

In this chamber 47 the heterogeneous mixture is mixed with a motorised auger 48 and there is carried out a first removal of the most coarse inerts still present subsequently in the mixture within a rather short contact time according to arrow F1 and thus the mixture with the still present inerts is supplied, through a further transfer auger 51, in a second chamber or vat 52, in which there occurs a smoother mixing, i.e. slower, of the mixture to perform a removal of the smaller, finer and heavier inerts and discharged. It shopuld be observed that all the inerts collected both in the first and in the second chamber 47 and 52 thus discharged outside the module 46 through a single system, i.e. the transfer auger 51 performed in a through fashion. As a matter of fact, as observable from FIGS. 10-13, in order to perform the discharge of the inerts in a raised position, for example allowing collection in a large underlying container placed against the ground (not illustrated), said inerts are transferred towards the discharge opening thereof 27 through an inclined discharge pipe 53 with an internal motorised 53A.

Figure 8:
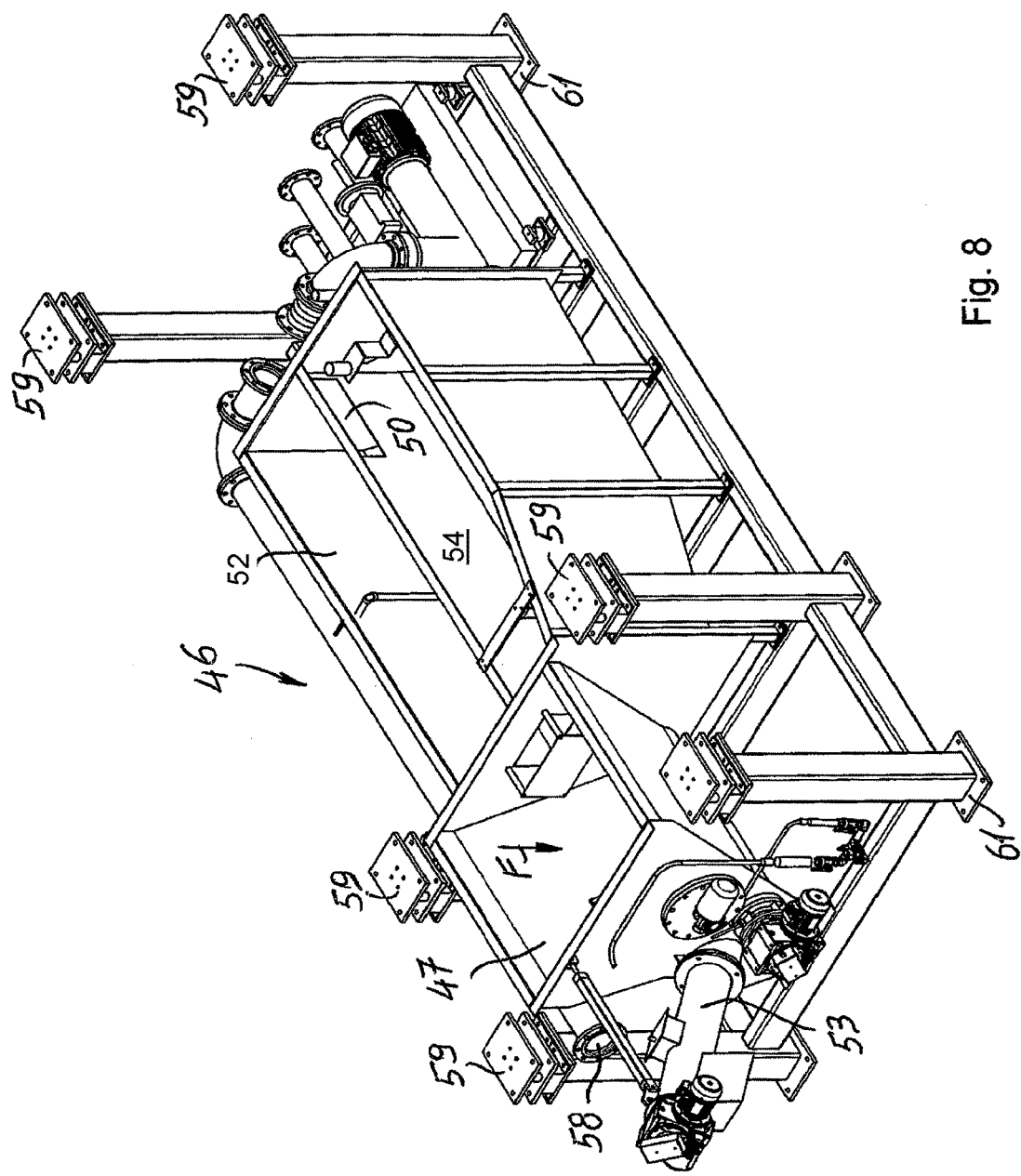
FIG. 8 shows a top perspective view of the lower module.

The FORSU mixture thus further deprived of the smaller and heavier inerts is conveyed, through an overflow opening 50, FIG. 8, to a third chamber 54, having a suitable volume, where there occurs a final mixture for homogenising the matrix which, being in a substantially liquid state, constitutes a practically homogeneous material which can be discharged/transferred directly by pumping, for example directly in a subsequent anaerobic digestion vat (not illustrated) wherein said substantially homogenised mixture represents an ideal material even for the subsequent anaerobic digestion treatment for producing biogas.

Figure 9:
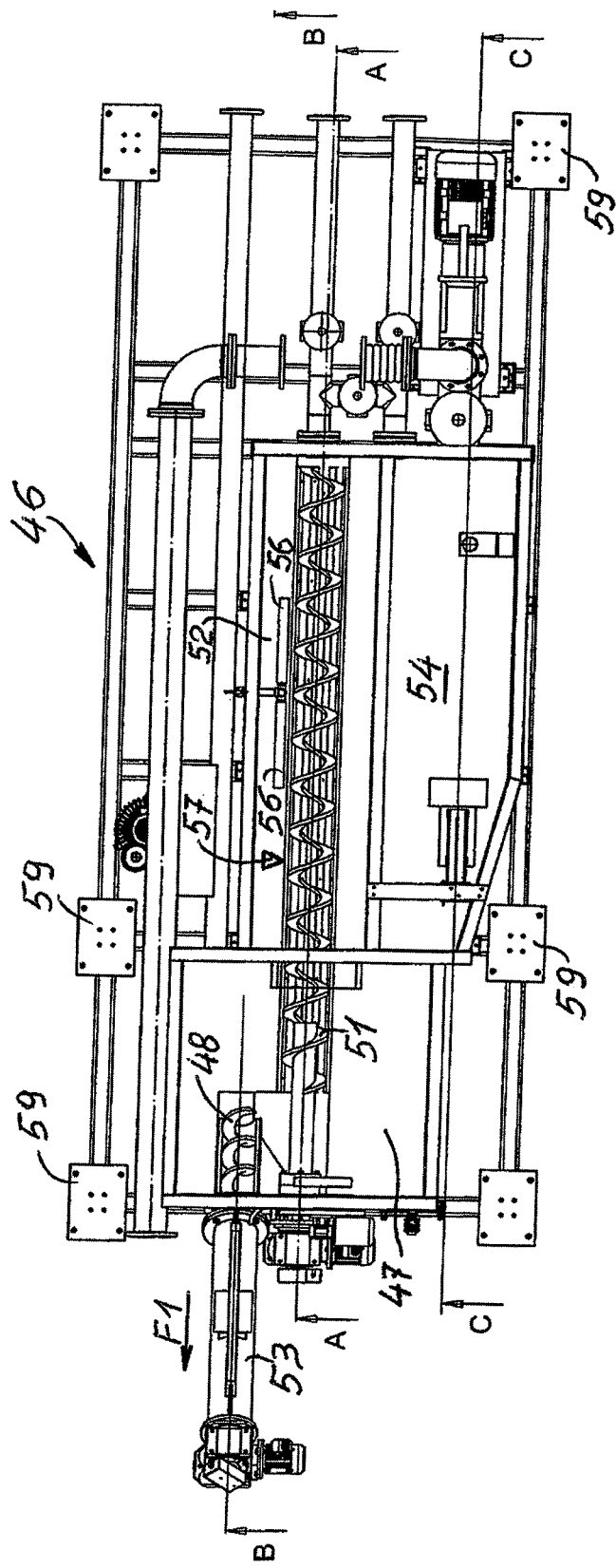
FIG. 9 shows a plan view of the lower module, FIGS. 10, 11 and 12 respectively show a longitudinal sectional view according to lines A-A, B-B and C-C of FIG. 9.
Figure 10:
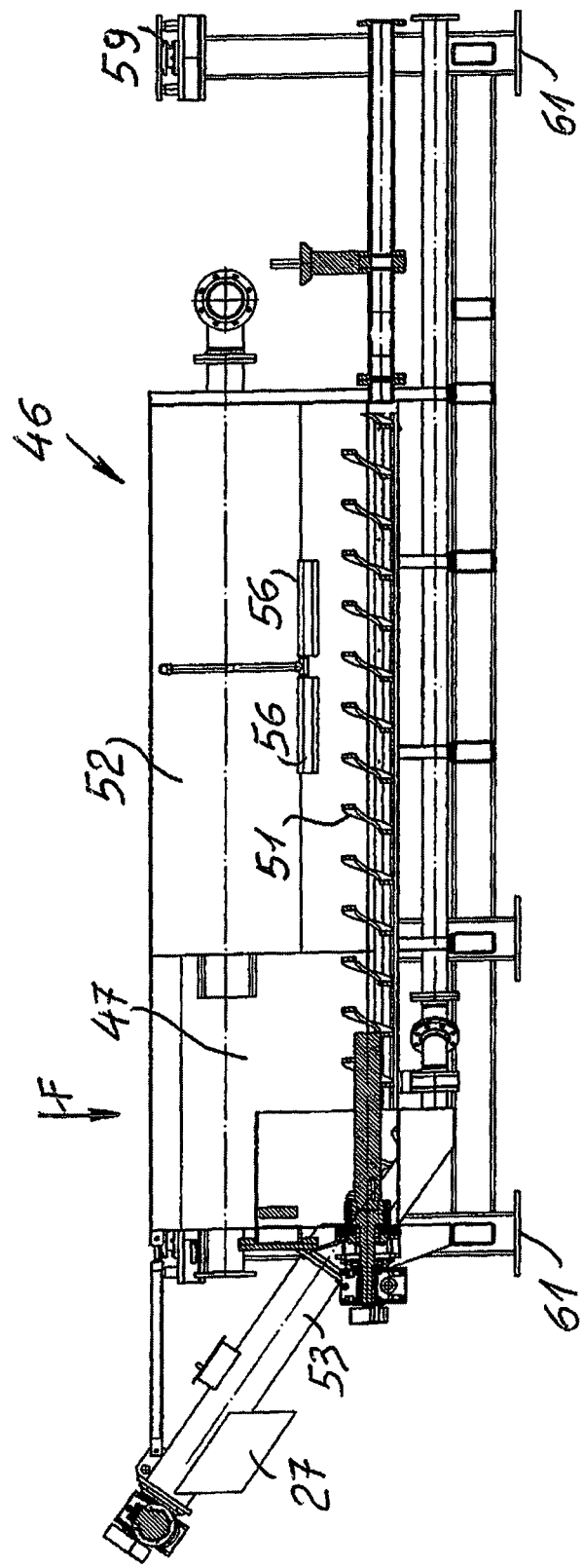
Figure 11:
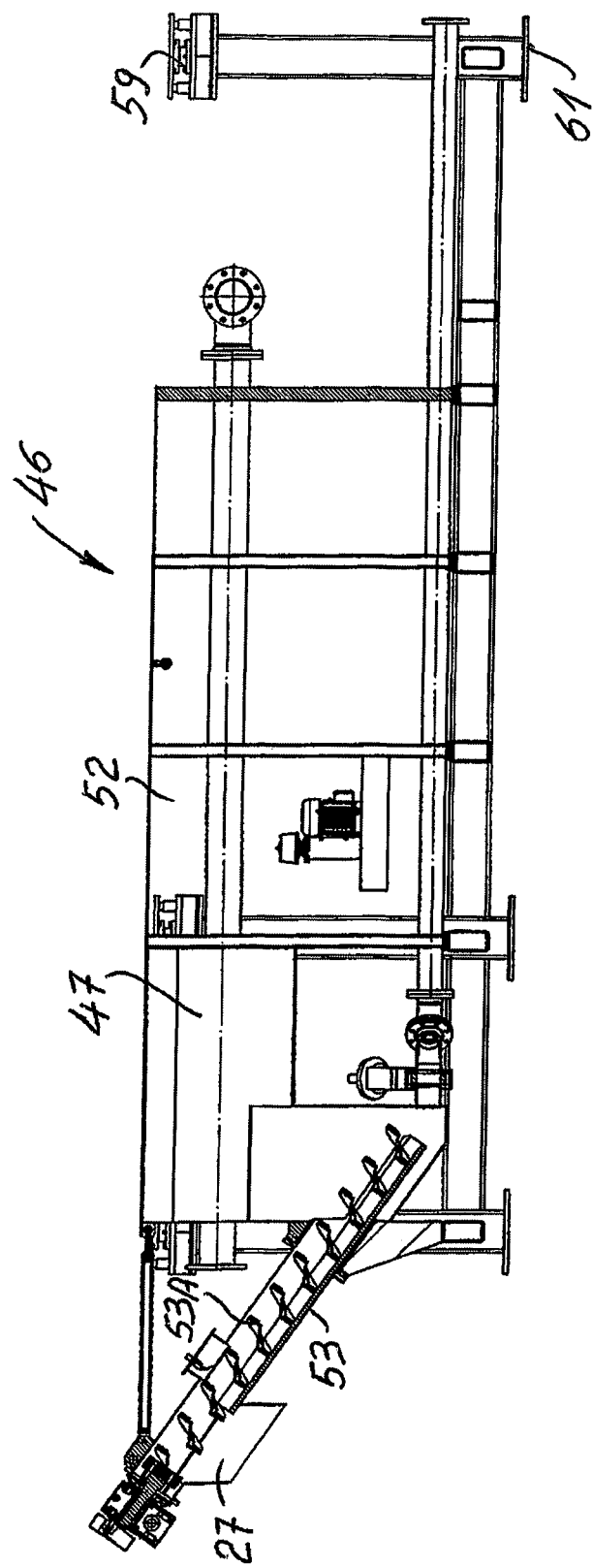
Figure 12:
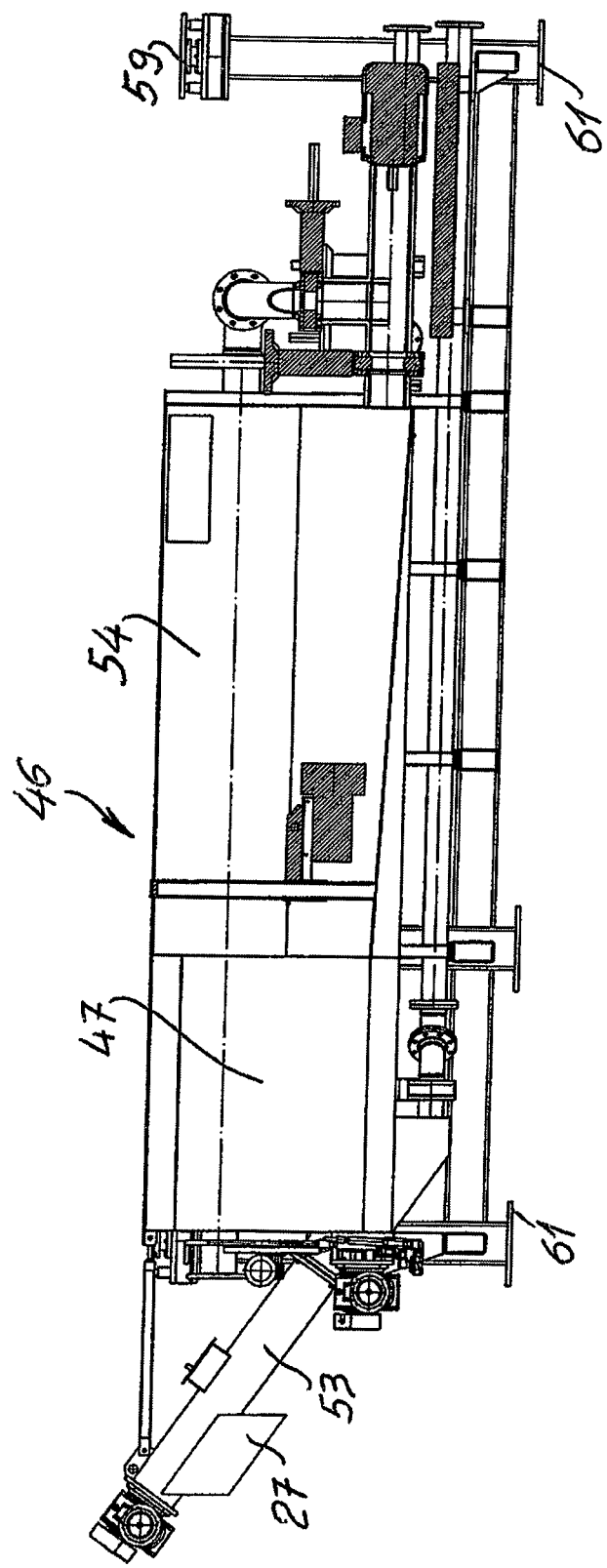
Figure 13:
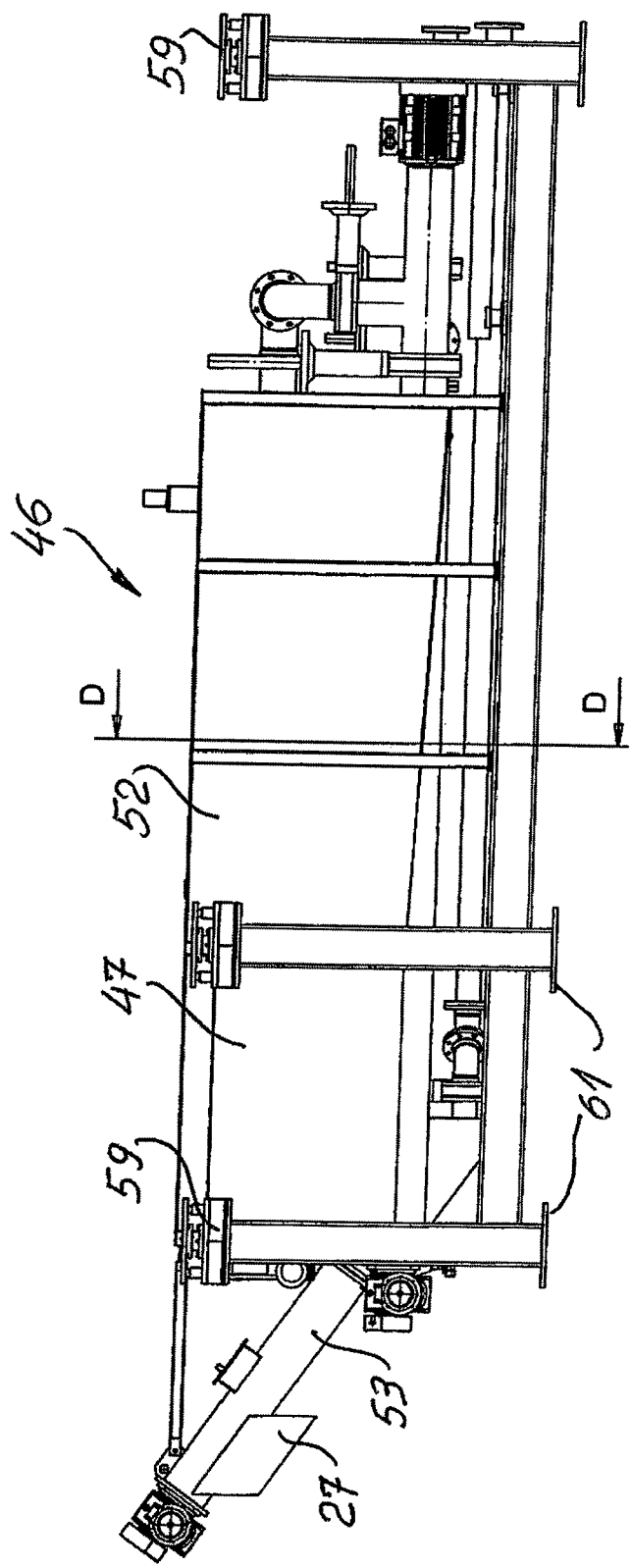
FIG. 13 shows a side elevational view of the lower module.
Figure 15:
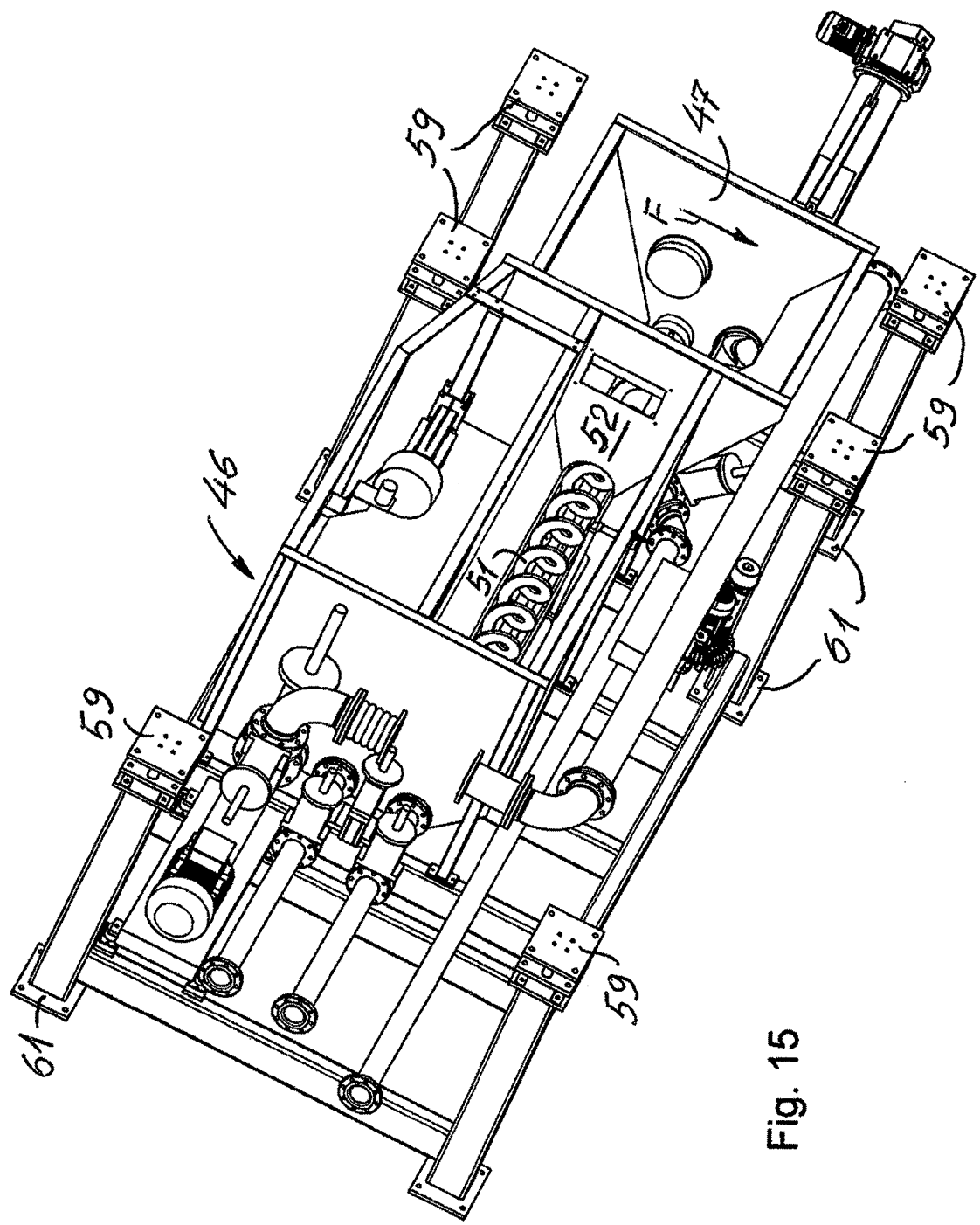
FIG. 15 shows a top perspective view on the lower module.

As observable from FIGS. 9 and 10 in the second chamber or vat 52 there are provided air or water insuflation devices 56 over a level 57 of the mixture in said chamber 52 to avoid the formation of stratiform surface aggregations of the lighter inerts and drive them again for the correct discharge thereof. The discharge opening of the pumpable homogenised mixture is indicated by the reference number 58.

The three discharges 36, 27 and 58 provided for in the treatment device 45 according to the invention are arranged on the same front side of the device 45 with the aim of requiring a smaller installation surface.

Regarding the conformation of the three provided treatment vats 47, 52 and 54, it is observed that the first chamber 47 is dimensioned to have a minimum contact time with the heterogeneous FORSU mixture which is directly discharged from the first module 10, while the second chamber or vat 52 and the rotation of the transfer auger 51 are dimensioned so as to have a low speed of the fluid FORSU mixture and a length of the vat capable of allowing safe sedimentation of the finest inerts, and the third chamber 54 has a suitable volume suitable to perform the final mixing for homogenising the matrix in the substantially liquid state and without inerts and thus allow pumping the FORSU mixture in the substantially liquid state, i.e. also optimal for anaerobic digestion.

According to a further teaching of the invention the two modules 10 and 46 are arranged superimposed through the interposition of load cells 59, as observable in the various figures. The support feet of the device 45 are indicated with 61.

The use of load cells 34 allows both weighing the amount FORSU supplied to the first module 10, same case applying to regulating the amount of mixing water through a control logic that can be attained easily, which considers the amount of FORSU treated by the device 45 both according to the absorption of power of the motors and the experience of an operator with possibility of manual intervention. Should one ignore the proposed possibility of weighing then it would be possible to simply provide the first mixing module 10 on the second homogenisation module 46 to guarantee the direct supply of the FORSU mixture from the upper module 10 the lower module 46.

According to another aspect of the invention the shells of the two modules 10 and 46 have a panelled execution comprising panels 62 that can be opened in a door-like manner, at the components requiring maintenance operations, and removable protection panels 63, for performing unexpected interventions in all points of the proposed device 45.

The method for treating the FORSU according to the invention differs from the known method for the production of a heterogeneous FORSU mixture due to the fact that additionally to this known mixing step there is provided a plurality of treatment steps in succession providing—at the end—a substantially homogenised FORSU mixture in the liquid state and practically without any type of inerts, hence reliably pumpable and without requiring any transport for passage from the mixing or preliminary treatment step to the further mixing step and homogenisation step.

Substantially the heterogeneous FORSU mixture provided by the first module 10 as illustrated above is subjected for a brief period of time in the first vat 47 to a disaggregation mixture with the auger 48 for facilitating an ejection (arrow F1) of the coarse inerts still present and which, —by gravity—, move towards the bottom of the chamber 47, for example with V-shaped cross-section, and the inerts still present are moved for discharging through the transfer auger 51, as well as the mixture is subsequently is subjected to a slower translation step for implementing a safe collection of the finest inerts, the heaviest of which move downwards while the lighter ones float, both being translated towards the discharge by the transfer auger 51, wherein the FORSU mixture thus also deprived of the finest inerts is then subjected to a subsequent mixing step for the homogenisation of the matrix thus leading to a substantially liquid state and adapted for the pumping transfer and the discharge thereof by the discharge opening 58, through an intermediate conduit (not illustrated), directly in an anaerobic digestion vat (not illustrated) or in a temporary storage vat or silo (also not illustrated), for the subsequent supply to the anaerobic digestion vat.

The various electrical and hydraulic circuits of the device in their entirety have not been illustrated for the sake of greater clarity of the drawings.

The structural and functional description, as well as the various operating aspects and the method according to the invention for the FORSU treatment and similar mixtures according to the invention show that with said proposed device and method efficiently meet the indicated task and the indicated advantages are obtained.

Those skilled in the art may introduce various modifications and/or variants, such as for example varying the arrangement and/or shape and/or number of chambers or subsequent treatment vats, or provide containment shells of the two modules for modules different from the illustrated panelling, or providing for a different system for the continuous control or weighing of the amount of treated FORSU, and so on and so forth, without departing from the scope of the present invention as illustrated and claimed.

The invention claimed is:

1. A device for the treatment of FORSU (Organic a Fraction of Municipal Solid Waste), comprising first module for the formation of a heterogeneous mixture of FORSU mounted above a second module for homogenizing the heterogeneous mixture of FORSU, wherein the first module comprises a longitudinal vat containing a first auger, a cylindrical filter that surrounds a second auger, the cylindrical filter being housed with an interspace in a vertical casing, the FORSU being conveyed from the longitudinal vat to the cylindrical filter, the vertical casing further comprises a tubular fitting for introducing the FORSU from the longitudinal vat to the cylindrical filter through a first opening provided at a lower end of the cylindrical filter, a plurality of nozzles for directing a liquid for diluting the FORSU on the cylindrical filter, and a second opening at an upper end for the discharge of coarse inserts, the second module comprises a first chamber, a second chamber and a third chamber, the first chamber is arranged below the cylindrical filter, the heterogeneous mixture of FORSU coming through the lower end of said cylindrical filter falls directly into the first chamber due to gravity, the first chamber contains a mixture and removal auger and a third auger for transfer and removal of residue inerts, the first chamber is followed by the second chamber having a greater longitudinal extension than the first chamber, and into which the third auger extends from the first chamber for conveying and removing finest inerts towards an external, the first chamber and the second chamber are in fluid communication with each other through a connection opening positioned on a separating wall between the first chamber and the second chamber, and the second chamber is followed by the third chamber for further mixing the matrix in the mixture in a substantially liquid state, and discharging the mixture through a discharge end, wherein between the second chamber and the third chamber there is provided an overflow opening, the connection opening has a lower height than that of the overflow opening, and the first chamber and the second chamber have a same level of liquid due to the overflow opening.

2. The device according to claim 1, wherein the first module is mounted on the second module through interposition of load cells.

3. The device according to claim 1, wherein the second chamber comprises an airflow or water supply means directed towards a floating surface of fine inerts.

4. The device according to claim 1 further comprising a housing for housing the two modules, wherein the housing includes fixed removable panels and panels that can be opened in a door-like manner.

5. The device according to claim 1, wherein the liquid for diluting the FORSU is water.

6. Method for the treatment of FORSU in a device of the type according to claim 1, comprising the formation of a heterogeneous mixture of FORSU with the removal of the most coarse inerts through the treatment of the FORSU supplied with a mixing liquid, for example water, in the cylindrical filter accommodating the second auger actuated for the removal of the coarse inerts, characterised in that the formed heterogeneous mixture is supplied by gravity in the first chamber for the mixing and removal of the most coarse inerts, followed by a second step of removing the finest and heaviest inerts, followed by a third step for mixing and homogenising the organic matrix with formation of a mixture substantially in the liquid state and dischargeable by pumping.

7. Method according to claim 6, characterised in that each of the three treatment steps following the formation of a heterogeneous mixture of FORSU occur in a respective chamber, wherein the step for the mixing and removal of the most coarse inerts present in the heterogeneous mixture occurs in the first chamber characterised by a relatively short contact time with said heterogeneous mixture and the mixing thereof for the removal of the residue coarse inerts, which are heavy and tend to move towards the bottom, the step for the slow mixing and removal of the finest and heaviest inerts occurs in the second chamber which is characterised by a greater longitudinal extension, and the third homogenisation mixture step occurs in the third chamber which is characterised by a suitable volume for homogenising the mixture to a homogenisation phase substantially liquid and pumpable.

8. Method according to claim 6, characterised in that the steps for the transfer and removal of the inerts from the first to the second chamber and to the external occurs through a single through auger.

9. Method according to claim 6, characterised in that in the chamber of removal of the fine inerts on the surface of the FORSU mixture there are supplied air or water jets for breaking possible stratiform agglomerations of floating fine inerts and facilitate the removal thereof.

10. Method according claim 6, characterised in that using load cells allows measuring the weight of the FORSU to be treated and, according to the results of a control logic of the stresses of the device of treatment, or the absorption of energy of the motors of the treatment device, there is regulated the amount of supplied water and there is measured the amount of FORSU treated by the device of treatment.

* * * * *